United States Patent [19]

Elbert

[11] Patent Number: 5,306,093

[45] Date of Patent: Apr. 26, 1994

[54] PROPELLOR SHAFT COUPLING

[76] Inventor: Alvin R. Elbert, 704 So. Springbrook Rd., Newberg, Oreg. 97132

[21] Appl. No.: 949,587

[22] Filed: Sep. 23, 1992

[51] Int. Cl.⁵ ............................ B25G 3/00; F16B 9/00
[52] U.S. Cl. ...................................... 403/259; 403/16; 403/356
[58] Field of Search ................. 403/259, 261, 356, 16, 403/320, 362, 355

[56] References Cited

U.S. PATENT DOCUMENTS

| | | | |
|---|---|---|---|
| 2,327,852 | 8/1943 | Batchelder | 403/52 |
| 2,851,903 | 9/1958 | Norris | 52/728 |
| 3,033,597 | 5/1962 | Miller | 403/16 |
| 3,862,808 | 1/1975 | Perini | 403/356 |
| 4,144,755 | 3/1979 | Palloch | 403/16 |
| 4,767,230 | 8/1988 | Leas, Jr. | 403/16 |

Primary Examiner—Paula A. Bradley
Assistant Examiner—Rex E. Pelto
Attorney, Agent, or Firm—James D. Givnan, Jr.

[57] ABSTRACT

A coupling receives a steeply tapered end of a propellor shaft and is secured thereto with a lock nut held in place with a set screw. A housing taper is steeper than known locking tapers to facilitate housing removal. The housing is internally threaded to receive an extractor element which, after lock nut removal, is screwed into the housing for abutment with the end of the propellor shaft with continued advancement of the extractor element resulting in housing separation from the shaft.

1 Claim, 1 Drawing Sheet

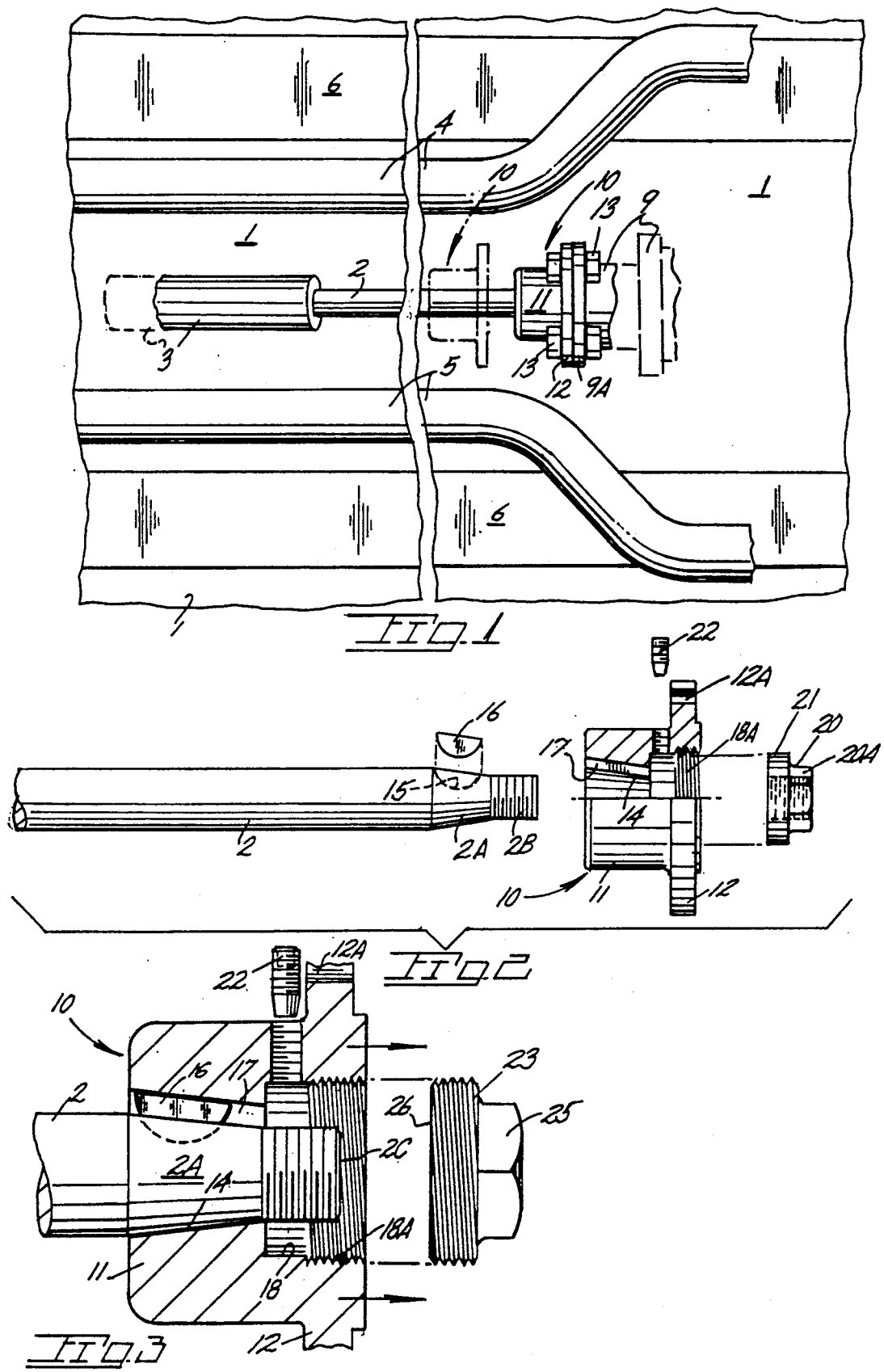

PROPELLOR SHAFT COUPLING

BACKGROUND OF THE INVENTION

The present invention pertains generally to a coupling for linking a propellor shaft end to a boat transmission.

A problem exists in the repair or replacement of boat propellor in small inboard boats such as those used in competitive water skiing. Currently such shafts are coupled to the boat transmission by using a locking tapered end segment and various locking nut and cotter pin arrangements. The disassembly of coupling and shaft would not be a problem were it not for the coupling itself being somewhat inaccessible in view of its location immediately above the lowermost portion of the hull and between exhaust pipes from each bank of the engine. Accordingly propellor shaft couplings take considerable time for detachment from the shaft end as the couplings must be hammered off a tapered shaft segment after removal of the locking nut element locking the shaft end to the coupling. The removal of the propellor shaft from an inboard boat constitutes a significant part of the cost of repairing or replacing of a damaged propellor shaft.

SUMMARY OF THE PRESENT INVENTION

The present invention is embodied in a boat propellor shaft to transmission coupling which includes threaded means for removing the coupling from the end of the shaft.

The present coupling housing and the propellor shaft end are provided with cooperating steep tapers which are of somewhat greater taper than normally used in such connections and accordingly require less force for axial separation of shaft and housing. A nut element on the shaft end locks same to housing as the nut element is locked against rotation by a locking set screw. Subsequent to locking screw and nut element removal, a threaded extractor is screwed into the interior of the coupling housing and comes into abutment against the end of the propellor shaft whereafter continued rotation of the extractor serves to lift and remove the coupling housing from the shaft end. Accordingly, removal of the coupling from the shaft is accomplished without applying impact blows to the coupling as is customary with prior housing removal efforts.

Important objectives of the present invention include the provision of a propellor shaft coupling which is readily detachable from a propellor shaft to reduce the man-hour effort encountered in shaft removal for replacement or repair regardless of restricted access to the coupling housing; the provision of a propellor shaft coupling which avoids the use of impact blows to remove the housing from the shaft; the provision of a propellor shaft coupling wherein a threaded extractor is utilized to bias the coupling housing away from the shaft end; the provision of a propellor housing which is not dependent on the use of locking tapers on the shaft and housing which hinders separation during shaft repair; the use of a locking nut with an annular rim and locking screw to lock same against rotation of the coupling housing.

BRIEF DESCRIPTION OF THE DRAWINGS

In the drawings:

FIG. 1 is a plan view of a segmented boat hull interior with a propellor shaft and coupling disposed between a pair of exhaust pipes;

FIG. 2 is an exploded view of the present coupling and the shaft segment; and

FIG. 3 is a vertical sectional view of the present coupling with the extractor element detached.

DETAILED DESCRIPTION OF THE PREFERRED EMBODIMENTS

With continuing attention to the drawings, the reference numeral 1 indicates the interior of a small boat hull of an inboard type boat having a propellor shaft 2 extending in an inclined manner, through the hull and a hull mounted bearing 3.

Boats used for competitive water skiing typically utilize V-8 engines with each bank of cylinders having a separate exhaust manifold and exhaust pipes as at 4 and 5. Hull stringers are at 6.

Indicated generally at 10 is a coupling joining the foreward end of propellor shaft 2 with a coupler assembly at 9 carried by the boat transmission drive shaft. The coupler assembly includes an apertured flange at 9A.

With attention now to the present coupling generally at 10, the same includes a housing at 11 having a flange 12 apertured at 12A to receive bolt assemblies 13 which also pass through aligned apertures in flange 9A of transmission coupler assembly 9. A tapered bore 14 of the present coupling receives a tapered end segment 2A of the propellor shaft which is recessed at 15 to receive a key 16 preferably of the Woodruff type. A key way is at 17 in the coupling housing. A bore at 18 in the housing of the present coupling is internally threaded at 18A for reception of a later described extractor element.

A lock nut 20 in FIG. 2 includes an annular rim 21. Threaded engagement of the lock nut with the threaded end segment at 2B of the propellor shaft locks the housing 11 to the shaft. To lock said lock nut 20 on the shaft a set screw at 22 seats against rim 21 of the lock nut. The lock nut has a hex head at 20A which receives a wrench during coupling removal from the propellor shaft.

An extractor element at 23 is threadeadly engageable with the internal threads 18A in the housing upon removal of the propellor shaft lock nut 20 in a shaft removal operation. Extractor element 23 includes a wrench receiving head at 25 and when torqued an extractor end wall 26 comes into abutment with the shaft end at 2C with subsequent rotation of the extractor element causing axial separation of coupling housing 11 from the shaft end.

In a typical installation in an inboard type boat, provision is made for limited rearward movement of the propellor shaft and attached coupling 10 subsequent to removal of bolt assemblies 13. Such limited movement permits a worker to insert an open end wrench between coupling 10 and the transmission mounted coupler assembly 9 for removal of lock nut 20, the installation and torquing of extractor 23 and the sidewise removal of coupling housing 11 upon separation from the propellor shaft end. Upon removal of present coupling 10, propellor shaft 2 may be pulled rearwardly through hull mounted bearing 3 for replacement or repair of the shaft.

The propellor shaft end segment 2A is tapered steeply at an inch or so per foot or more to assure convenient removal by use of the extractor element.

Subsequent to removal of the housing, the same may be used again with a new or repaired shaft upon reinstallation of lock nut 20 in place of the extractor element used only during housing removal.

While I have shown but one embodiment of the invention, it will be apparent to those skilled in the art that the invention may be embodied still otherwise without departing from the spirit and scope of the invention.

I claim:

1. In combination,
   a propellor shaft having a steeply tapered end segment, a recess, a key and a threaded segment terminating in an end wall,
   a coupling including a housing having a steeply tapered bore to receive said steeply tapered end segment, an internal wall having internal threads defining an area into which said threaded segment of the shaft projects,
   a lock nut having an annular rim, said annular rim being means for engaging said threaded segment of the propellor shaft to lock the housing to the steeply tapered end segment of the shaft,
   a set screw carried by said housing, said set screw being means for engaging said annular rim of the lock nut at a selected point located on said annular rim, and
   an extractor element externally threaded and being means for engagement with the internal threads of said housing, an end face on the extractor element being means for engaging the end wall of the propellor shaft with rotation of said extractor element, subsequent to end wall engagement, resulting in axial displacement of the housing away from the steeply tapered end segment of the propellor shaft, said extractor element including a head with flats thereon which protrudes from said coupling when the extractor element is in place on the coupling, said head being means for application of a wrench to the extractor element.

* * * * *